Figure 1:
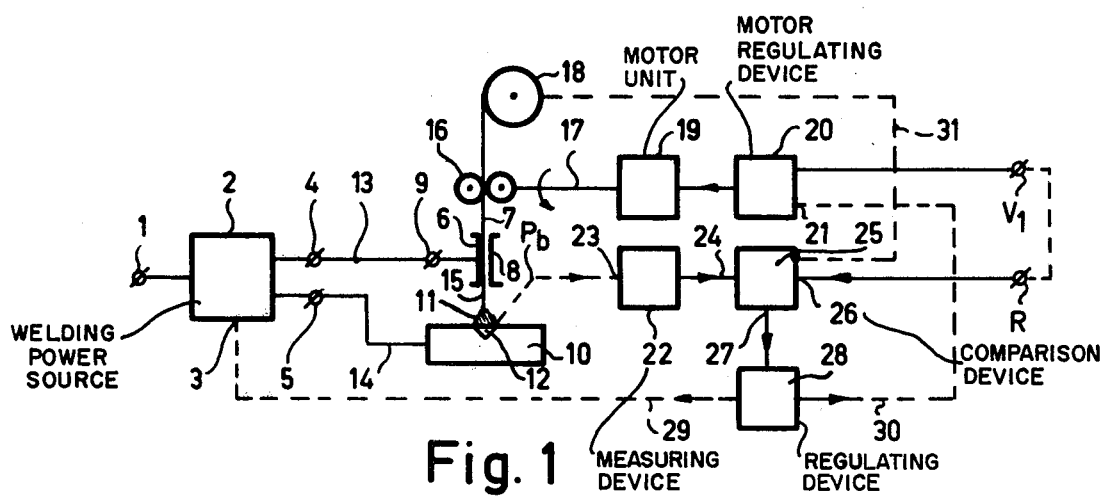

United States Patent [19]

De Keyser

[11] 4,000,374
[45] Dec. 28, 1976

[54] WELDING SYSTEM PROVIDED WITH WIRE FEED AND ARC CONTROL

[75] Inventor: Edmond Joannes Jozef De Keyser, Bierges lez Wavre, Belgium

[73] Assignee: U.S. Philips Corporation, New York, N.Y.

[22] Filed: July 1, 1974

[21] Appl. No.: 484,585

[30] Foreign Application Priority Data

July 4, 1973 Netherlands .................... 7309296

[52] U.S. Cl. .......................................... 219/131 F
[51] Int. Cl.² ........................................ B23K 9/12
[58] Field of Search .... 219/131 F, 131 WR, 131 R, 219/135

[56] References Cited

UNITED STATES PATENTS

| | | | |
|---|---|---|---|
| 2,529,111 | 11/1950 | Steinberger | 219/131 F |
| 2,636,102 | 4/1953 | Lobosco | 219/131 F |
| 2,873,402 | 2/1959 | Needham | 219/131 R |
| 3,530,359 | 9/1970 | Grist | 219/135 |
| 3,538,376 | 11/1970 | Parker | 219/131 R |
| 3,614,377 | 10/1971 | Stearns et al. | 219/131 R |
| 3,728,516 | 4/1973 | Daspit | 219/135 |
| 3,731,049 | 5/1973 | Kiyohara et al. | 219/131 F |

*Primary Examiner*—J. V. Truhe
*Assistant Examiner*—Clifford C. Shaw
*Attorney, Agent, or Firm*—Frank R. Trifari; Bernard Franzblau

[57] ABSTRACT

In the process of arc welding with electrode wire feed there are many parameters which influence the quality of the welded joint. The welding system proposed provides considerable quality improvement, particularly in short-circuiting arc welding, reduces the dependence of the welding process upon the skill of the welder and greatly simplifies setting of the apparatus. A characteristic regulating parameter of the welding process is regulated so that the mean arc power remains substantially constant. Embodiments given by way of example illustrate ways of measuring and controlling the mean arc power, which, according to the insight on which the invention is based, is the factor which determines quality.

12 Claims, 4 Drawing Figures

WELDING SYSTEM PROVIDED WITH WIRE FEED AND ARC CONTROL

The invention relates to a welding system provided with wire feed, for short-circuit arc or diptransfer welding. The invention comprises a source of welding energy, a device for feeding consumable electrode wire and an electrode wire holder having a terminal connected to the welding energy source, which source is also provided with a terminal for connection to the workpiece to be welded, in which system during the welding operation control parameters, such as the open-circuit welding supply voltage $E_o$ and wire feed rate V, are distinguished.

When welding with the use of consumable electrode wire many parameters influence the welding process. Assuming the welding rate, i.e. the rate at which the wire holder travels with respect to the workpiece, to be matched to the melt-off rate of the electrode wire, so that a satisfactory welded joint is obtained, two parameters which influence the welding process will be considered in more detail. One parameter is the open-circuit voltage $E_o$ which mainly influences the welding energy, and the other parameter is the electrode wire feed speed V which determines the melt-off rate, that is the amount of material melted per unit time. The influence of $E_o$ and V is shown by a few extreme set points. At a large V relative to $E_o$ the electrode wire mainly melts by heat developed in the wire, and there is hardly any arc. The arc heat hardly influences the melting of the wire. The relative arc time $A_b$, which is defined as the arc time $T_b$ divided by the cycle time T, is very small.

When $E_o$ is large relative to V an arc is obtained which causes the wire to melt at a rate such that the arc is extinguished and there must be a waiting period until the wire again makes a short circuit to the work piece. The influence of preheating of the wire due to an $I^2R$ effect is small.

The latter setting can be varied so as to produce a continuous arc and uniform melting of the wire, for example, by slightly reducing $E_o$ or slightly increasing the speed V. In this region we have $A_b = 1$. Between the former and the latter regions there is a setting region in which arc periods alternate with short-circuit periods, so that $A_b$ lies between 0 and 1. During the arc period the work piece is heated and the electrode wire melts to form a drop which contacts the molten material of the work piece before being detached from the wire, producing a short circuit. From the welding supply a short-circuit current flows which detaches the drop from the solid part of the wire projecting from the wire holder. Simultaneously an arc is struck between said solid part and the workpiece and the heat of the arc inter alia again causes the end of the wire, which had already been heated by the previous arc currents and short-circuit currents, to melt in the form of a drop. The welding process described, which is known by the name of short-circuit arc welding or dip transfer welding, for certain uses has many advantages which include:

an accurate directive effect to weld at the correct location. This is due to the small size and rapid succession of the drops;

improved control of the heat supplied to the workpiece so that thin material can be welded with less likelihood of burning through. Heating of the location at which the drops land is fairly adjustable.

Welding processes in which an arc is struck generally are self-adjusting. Within given limits the electrode wire melts evenly. If for example the welding energy becomes excessive, initially preheating of the wire increases, as does the temperature of the arc. As a result the wire will melt faster. The arc voltage increases and because it acts as a back e.m.f. for the welding voltage the current decreases so that the welding energy is reduced and hence the accelerated melt-off rate is retarded to the initial value. When the welding energy is reduced the wire approaches nearer to the work piece, the arc voltage is reduced and the welding current increases to increase the welding energy again.

With dip transfer welding, however, the said property of self-adjustment gives rise to difficulty. In this process too, variations in welding energy will be accommodated by the arc power and give rise to variations in the spacing between the workpiece and the solid part of the welding wire. In other words, with constant spacing between electrode wire holder and workpiece the length of the electrode portion which protrudes from the holder will vary. Because, however, an arc is struck for part of the time, the variation in the arc power is found to be considerable, causing a change in drop size. In the case of increased welding energy a condition is produced in which the arc time increases comparatively, the short-circuit time decreases comparatively and the overall cycle time increases. The latter is due to the fact that an increase of the spacing between the workpiece and the solid part of the wire causes larger drops to be formed. From the above it will be clear that the relative arc time $A_b$ increases. Measurements show that preheating of the electrode wire only changes slightly. With decreasing energy the protruding length increases, the drop size decreases, the cycle time is shortened and the relative arc time is reduced.

Variations in the protruding length, due for example to involuntary movements of the welder operating the welding gun, are also accommodated by a self-regulating effect between the preheating of the electrode wire and the mean arc power.

However, it has been found in practice that the welder and the various parameters still exert an influence such that a good weld is not ensured under all conditions. The purpose of the welding process after all is not just to use a given amount of material but to make a homogeneous weld with good fusion. Thus a less skilled welder when welding thin sheet will tend to select too low an energy setting, that is approximately to select too low an open-circuit voltage, in order to prevent burn-through. Such a selection frequently gives rise to welding defects because locally the arc power was insufficient to adequately heat and melt the workpiece.

A low setting may also be chosen to permit better control of the molten pool in the work piece or, in the case of vertical position welding, to prevent sagging of the molten pool. It will be clear that in these cases the parameters, such as variation of the open-circuit voltage due to supply voltage fluctuations, variation of the protruding length, variation of the ohmic resistance in the welding circuit and variation of the electrode wire feed rate, will exert considerable influence and may give rise to an excessively large or, in most cases, an excessively small arc power.

The present invention is based on the recognition that in short-circuit arc welding a constant arc power is the determining factor for achieving a good weld.

Maintaining constant the mean arc power taken over a suitably chosen time interval in conjunction with the self-regulating effect of the welding process will ensure a constant heat supply to the workpiece producing a weld having good fusion and good adherence between the added material and the work piece material under various conditions and with reduced dependence upon the skill of the welder. For this purpose a welding system of the abovedescribed type is characterized in that it includes a measuring device which produces a measuring quantity representative of the mean arc power $P_b$, a comparison device which compares the measuring quantity with a set reference quantity and in the case of a deviation between measuring and reference quantities produces a regulating quantity for controlling a first regulating device which influences a regulating parameter of the welding system in a compensating sense, causing the power $P_b$ to remain substantially constant.

For elucidation it should be mentioned that the mean arc power determines the amount of heat supplied to the workpiece so that regulation of this power means regulation of the heat supplied to the workpiece. Insufficient heat involves poor adherence, the material of the electrode wire lying on the workpiece, whereas excessive heat causes excessive melting of the workpiece resulting in holes in thin sheet material. A correct supply of heat results in a correct degree of "penetration".

The welding system according to the invention provides the advantage of further automation of the arc welding process, enabling welders of lesser skill to adjust the apparatus and resulting in constant welding quality. As has been mentioned hereinbefore, this is of particular importance for welds being made by means of short-circuit arc welding.

In one embodiment the electrode wire feed rate V is used as a regulating parameter. For this purpose the wire feed device is provided with a motor control device connected to the control device of the welding apparatus according to the invention. This has the advantage of providing a very simple welding apparatus. However, the welding rate must be matched to the melt-off rate, which in this process will vary slightly.

In another embodiment the open-circuit welding voltage $E_o$ is used as a regulating parameter. Such a method provides a more accurate welding apparatus having a constant melt-off rate.

To enable the mean arc power to be measured the said embodiments according to the invention preferably are characterized in that over a prolonged time, or over the cycle period T, either the mean arc current $I_{bgem}$ during the arc time $T_b$ or the arc time $T_b$ is measured. Although an indication of the mean arc power is obtainable by measuring the voltage at the welding supply terminals or at the terminal of the electrode wire holder during the arc period and by multiplying this voltage by the arc current $I_b$ and integrating with reference to time, the last-mentioned embodiments are distinguished by their measuring simplicity. The difference in welding supply terminal voltage between the arc voltage and the short-circuit voltage is readily detectable by electronic means permitting the arc time and the short-circuit time to be determined. Since in short-circuit arc welding it has been found that the arc voltage may be assumed to be substantially constant, it is sufficient to determine the mean arc current during the arc time and to control the process by means of the product $A_b.I_{bgem}$ per cycle or, over a prolonged time $t$, by means of the summation of $I_{bgem}.T_b$ per period $t$.

If, in a more extensive automatic welding apparatus the protruding length does not vary, it is sufficient to control the welding process with reference to the arc time $T_b$ or to the relative arc time $A_b$ as a parameter for a constant mean arc power.

When welding with a continuous arc, $A_b$ is equal to 1 and the process can be controlled by means of the mean arc power or the mean arc current, so that the aforementioned self-regulating effect is enhanced and better welding results are obtained. In any case, in such a controlled apparatus supply voltage fluctuations and variations in contact resistance in the welding circuit, which always affect the welding energy and hence the arc power, are removed by regulation.

In a welding system according to the invention, preferably an integrating amplifier is used by means of which a measure of the mean arc power, represented by $A_b.I_{bgem}$ or by the summation of $I_{bgem} . T_b$ per period $t$, is simply obtained.

Figure 2:
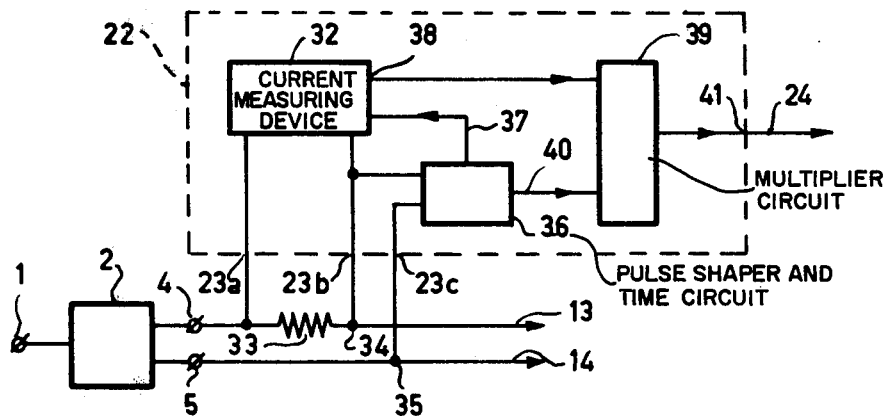
Figure 3:
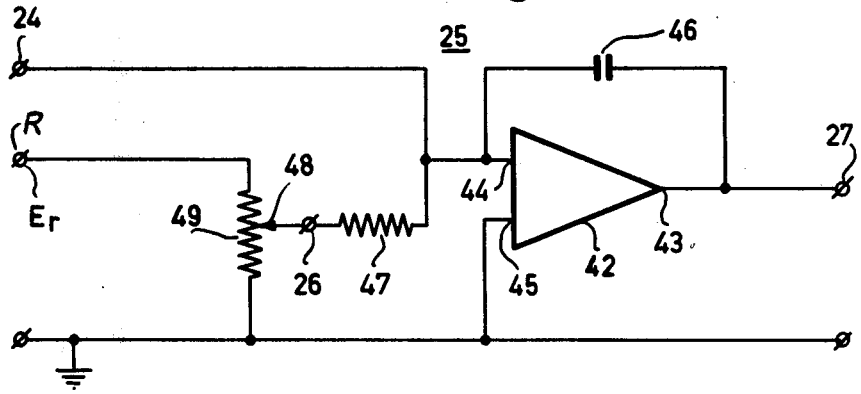
Figure 4:
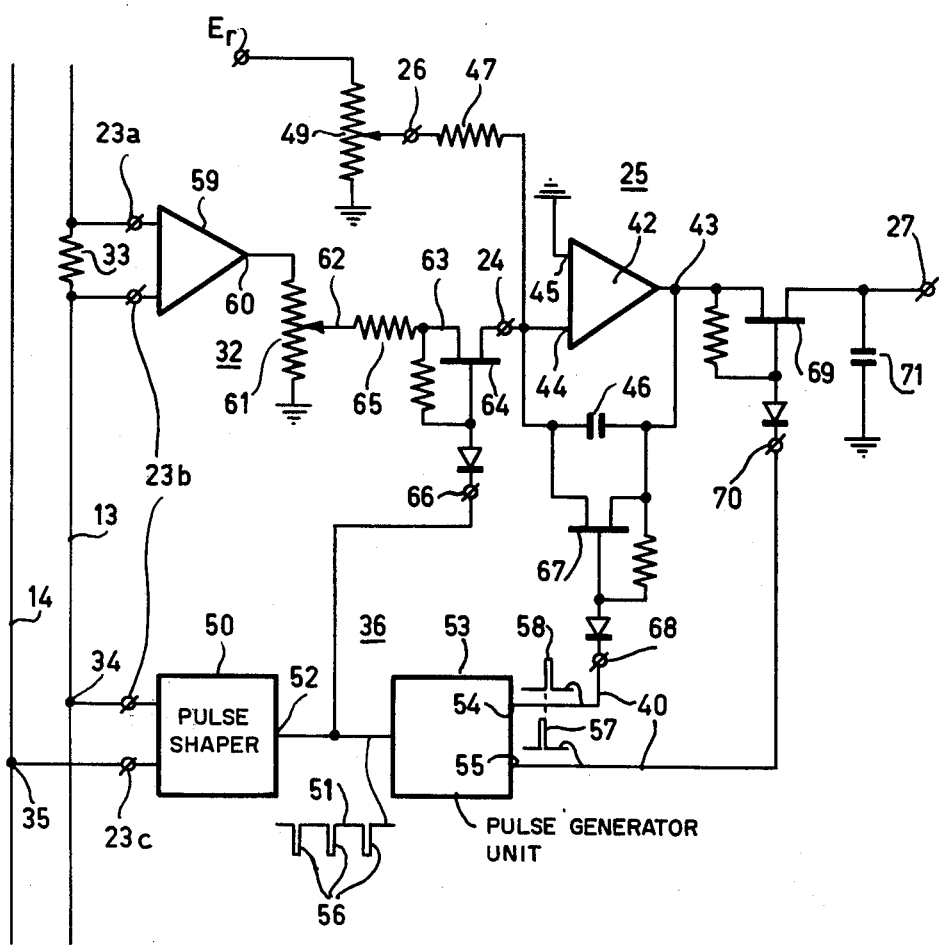

An embodiment of the invention will now be described, by way of example, with reference to the accompanying diagrammatic drawings, in which:

FIG. 1 is a schematic block diagram of a welding system according to the invention, FIG. 2 is a schematic block diagram of a measuring device according to the invention, FIG. 3 is an integrating amplifier provided with a reference quantity and used in the welding system according to the invention, and FIG. 4 shows in more detail a circuit diagram of the measuring and comparison device according to the invention.

Referring now to FIG. 1, a welding system according to the invention has a terminal 1, shown symbolically, which is connected to the supply lines which supply the welding energy. A welding power source 2 has two output terminals 4 and 5 between which the welding voltage and, when no welding is in progress, the open-circuit voltage $E_o$ can be measured.

The welding power source 2 may be provided with an input 3 by means of which the open-circuit voltage $E_o$ can be set. In this case a thyristor-controlled source including a control unit for the thyristors is preferably used. Welding power sources supplied from a two-phase or multi-phase A.C. supply and possibly provided with a thyristor control unit are assumed to be known. Since they form no part of the invention idea, they will not be described. An electrode wire 7 is fed to a wire holder 6 and is guided to the work piece 10 by way of a guide member 8 having a terminal 9. An arc 11 melts the wire and produces the molten pool 12 of the workpiece, depending upon the welding process used. The welding energy is supplied via cables 13 and 14, the cable 13 connecting the terminals 4 and 9 and the cable 14 connecting the terminal 5 of the source 2 to the workpiece 10. Thus, the welding circuit comprises the welding cable 13, the wire holder 6 including the guide member 8, a protruding length 15 of the wire, the arc part 11, the workpiece 10 and the welding cable 14. The wire 7 is supplied from a reel 18 by rollers 16 driven by means of a shaft 17. The shaft 17 is connected to a motor unit 19 which is controlled by a motor regulating device 20 which may be self-regulating and impart a constant speed V to the wire or may be controlled at an input 21 or at an input $V_1$ so that the speed V is adjustable in a wide range. One suitable form of motor unit and regulating device is shown in U.S. Pat. No. 2,636,102. According to the invention the welding system of a known type described so far is provided with a measuring device 22 which has inputs 23 to which data are supplied for determining the mean arc power of the arc 11. This is indicated symbolically in FIG. 1 by a broken line $P_b$ which joins the arc 11 to the inputs 23. A measuring quantity which represents the mean arc power is supplied via a lead 24 to a comparison device 25 to an input 26 of which a reference quantity R is supplied.

When the value of the measured quantity deviates from the value of R the comparison circuit, at its output 27, produces a control signal which is applied to a first regulating device 28. U.S. Pat. No. 3,530,359 shows apparatus suitable for use as the welding source 2 and the regulating device 28. The device 28 may be an amplifier circuit proportioned so as to produce suitable control signals on a line 29 connected to the input 3 of the welding power source 2, assuming the latter is provided with a device for setting the welding energy. Such setting devices are known and either may be of the transductor type, permitting the welding voltage, the welding current or both to be set, or they may, for example, include thyristors by means of which the regulating parameter (e.g. the open-circuit voltage $E_o$) is set via a control unit connected to the input 3. Also, the control signals from the regulating device 28 may be applied via a lead 30 to the input 21 of the motor control device 20. Such regulating devices also are known and generally are provided with thyristor regulators and tachogenerator feedback loops for maintaining a set wire feed rate constant. In addition to the above-mentioned regulating parameters, such as open-circuit voltage $E_o$, welding voltage, welding current, welding energy and wire feed rate V, other regulating parameters may be used, such as the distance between the wire holder and the workpiece, the welding rate or suitable combinations. Further automation of the welding system is obtained when information about the wire diameter is applied from the reel 18 through a lead 31 to the comparison circuit 25, causing the properties of this circuit or the value of the reference quantity R to be adapted to the wire diameter. Thus a welding system is obtainable the operation of which is generally simplified, because only a single setting knob, namely that for setting the wire feed rate V, to which the reference quantity R is tied, is left, as is indicated in FIG. 1 by the broken line joining R to $V_1$.

FIG. 2 shows part of the welding system of FIG. 1 with the measuring device 22 shown in more elaborate block-schematic form. Terminals 23a and 23b of a current measuring device 32 are connected to a welding circuit which incudes a small impedance 33. Thus a voltage proportional to the welding current is obtainable. The welding voltage is taken from two tappings 34 and 35 on the cables 13 and 14 respectively. The tapping 34 is connected to the input 23b and the tapping 35 is connected to an input 23c. In the measuring device 22 there is connected to the inputs 23b and 23c a unit 36 which includes a pulse shaper which is provided with known limiting and voltage level detecting means. From the welding voltage, which in short-circuit arc welding has two values, namely that of the short-circuit voltage of the order of, say, from 1 to 10 volts and that of the arc voltage of the order of, say from 15 to 35 volts, a rectangular signal can be derived the edges of which coincide with the transition from arc to short-circuit or from short-circuit to arc. The pulse shaper may be provided with filter elements which eliminate incidental short-circuits. The unit 36 further includes a time keeper which, under the control of the said rectangular signal, generates time signals which are a measure of the arc time $T_b$ and the cycle time T. By way of example, during the time $T_b$ a switch may be closed, causing a current supply source to charge a capacitor to a voltage which represents the time $T_b$, while a similar means can deliver a capacitor voltage which represents a time T. By applying these voltages to a dividing circuit a signal is obtained which is proportional to the relative arc time $A_b$. The said rectangular voltage may be applied via a lead 37 to the current measuring device 32 to derive the arc current from the welding current, so that the device 32 at an output 38 delivers a signal representative of the mean arc current to a multiplying circuit 39. Through a lead 40 the unit 36 applies a signal representative of the relative arc time $A_b$ to the circuit 39. The multiplying circuit 39 produces a signal at its output 41 which represents the measuring quantity and is equal to the product of $I_{bgem}$ and $A_b$.

When welding with a continuous arc the unit 36 may produce a signal on the line 40 which has a fixed value corresponding to $A_b = 1$. In this case the pulse shaper may deliver a rectangular test voltage instead of the rectangular voltage produced in short-circuit arc welding by the short-circuit voltage/arc voltage cycle. This may be of importance when the current measuring device has an integrating function and requires a reset signal, for example, via the lead 37. In welding processes in which the protruding length 15 of FIG. 1 remains constant, as is the case in automatic welding systems, this is found to be sufficient to perform control with reference to a constant mean arc time $T_b$ or to $A_b$. In this case, in the diagram of FIG. 2, the units 32 and 39 may be omitted or the unit 32 may supply a constant signal to the multiplying circuit 39.

FIG. 3 shows a known integrating circuit which may be used in the welding system according to the invention as the comparison circuit 25. An amplifier 42, which may be an operational amplifier, at its output 43 produces the control quantity in the form of a voltage relative to ground. An input 45 is connected to ground, and an input 44 is connected to the output 43 by means of an integrating capacitor 46. The input 44 is the summation point for a measuring current and a reference current, the latter current being determined by a resistor 47 and by the voltage at the slider 48 of a potentiometer 49. The potentiometer is fed with a constant reference voltage $E_r$. The control quantity will be zero when the reference current flows to the input terminal 24, which means that the measuring quantity at the relevant instant has a current value equal to the desired setting or reference value. An advantage of this comparison circuit is that the integrating function permits some smoothing and filtering elements to be omitted from the control circuit.

An advantageous use of the integrator of FIG. 3 is shown in the circuit diagram of FIG. 4 in which various functions of the units 32, 36 and 39 of FIG. 2 are combined. The pulse shaper 50 has input terminals 23b and 23c to which is applied the welding voltage derived from the tappings 34 and 35 of the cables 13 and 14 respectively. The pulse shaper produces at its output terminal 52 the pulse shaper a rectangular signal 51 which is applied to a pulse generator unit 53 which includes two intercoupled monostable multivibrators. At the leading edge 56 of the rectangular signal 51, which corresponds to termination of the short-circuit, the first multivibrator is started, delivering a short sampling pulse 57 at an output 55. The trailing edge of the sampling pulse triggers the second multivibrator, which as a result produces a reset pulse 58 at an output 54. The pulse shaper 50 may comprise a transistor with a collector output, an emitter connected to terminal 23c and a base connected via a zener diode to terminal 34. A resistor with antiparallel diodes may be connected in parallel with the base-emitter junction.

The current measuring device 32 is provided with a buffer and measuring amplifier 59 the input terminals of which are connected to the terminals 23a and 23b for receiving the voltage across the resistor 33 through which the welding current flows. At the output terminal 60 of the amplifier 59 a voltage is produced which is representative of the welding current.

The output 60 is connected to a potentiometer 61 having a slider 62 which is connected to a terminal 63 of a switch 64 via a resistor 65. The other end of the switch 64 is connected to the input 24 of the comparison circuit 25 for delivering the measuring quantity. A control input 66 of the switch 64 is connected to the output 52 of the pulse shaper 50. As a result the switch passes current during a time which corresponds to the arc time $T_b$ and a current which represents the arc current is supplied to the summation point at the input 44. With reference to a charge $Q_m$ supplied to the input 24 it may be assumed that the potentiometer 61 and the resistor 65 together with the switch 64 form a multiplying circuit because $$Q_m = \int_0^{T_b} I_b \cdot dt = I_{bgem} \cdot T_b \tag{1}$$

where $I_b$ represents the instantaneous arc current and $I_{bgem}$ represents the mean arc current during the time period $T_b$.

The integrating capacitor 46 can be short-circuited by a switch 67 having a control input 68 which is connected to the output 54. The reset pulse 58 causes the switch 67 to pass current briefly so that the charge of the capacitor 46 becomes zero.

The output 43 of the amplifier 42 is connected via a switch 69 having a control input 70 to a storage capacitor 71 which is grounded at one end and at the output 27 produces a voltage which represents the control quantity. The control input 70 is connected to the output 55, causing the switch 69 to be briefly closed by the sampling pulse 57.

The pulses 57 and 58 occur at regular time intervals with a pulse spacing equal to the cycle time T. Because the pulse 57 appears first, the voltage at the output 43 is applied, at intervals equal to the time T, to the storage capacitor 71 which stores this information during the succeeding cycle time T which may have a different value. Immediately after the pulse 57 the pulse 58 resets the integrator 42-46 to zero so that the integrated data of the preceding cycle are removed. The switches 67 and 69 together with their controls may be regarded as a dividing circuit which relates measured values of the arc current $I_b$ and the arc time $T_b$ to the cycle time T.

During the cycle time T the reference source, which comprises a constant voltage source $E_r$, the potentiometer 49 having a division ratio B and the resistor 47, supplies a charge $Q_r$ to the summation point at the amplifier input 44. The resistor 47 has a value $R_{47}$ so that at a maximum a reference current $I_r$ equal to $E_r/R_{47}$ can be supplied. The condition:

$$Q_r = B \cdot I_r \cdot T \tag{2}$$

applies. If we further assume that the voltage $E_r$ is positive and the voltage at the output 60 is negative, the voltage $V_{43}$ at the output 43 is equal to the voltage $V_{46}$ across the capacitor 46 for which the following condition applies:

$$V_{43} = V_{46} = Q_{46}/C_{46} \tag{3}$$

where $C_{46}$ is the capacitance of the capacitor 46 and $Q_{46}$ is its charge.

Furthermore we have $$Q_{46} = Q_m - Q_r \tag{4}$$

so that $$V_{43} = \frac{I_{bgem} \cdot T_b - B \cdot I_r \cdot T}{C_{46}} \tag{5}$$

or $$V_{71} = V_{43} = \frac{T}{C_{46}} [A_b \cdot I_{bgem} - B \cdot I_r] \tag{6}$$

From the equality (6) it follows that the capacitor voltage $V_{71}$, which forms the regulating quantity, is zero when the mean arc power represented by $A_b \cdot I_{bgem}$ is equal to B. $I_r$. It will be clear that the said power is adjustable and for making the desired welded joint can be determined by the welder, having regard to the wire feed rate.

As the description of the device of FIG. 4 clearly shows, the integrating amplifier 42 together with the capacitor 46, has an integrating function with respect to the measuring signal and the production of the regulating signal. The regulating loop is closed for a short time only during the sampling pulse. To achieve a stable and non-oscillating regulating loop of fairly fast response it is desirable for the first regulating device 28 of FIG. 1 to be provided with an integrating function which sums the regulating quantity at the terminal 27 of FIG. 4 and limits it to a maximum positive or negative value, for in the practice of short-circuit arc welding it is found that occasionally disturbances give rise to the formation of an excessively large drop which through the measurements of $A_b$ and $I_b$ gives rise to an extreme value of the regulating quantity at the output 27. Because the other regulating time constants and the inertia of the molten pool are large enough, such a summation function, subject to a limitation which becomes operative in the above example is not a disadvantage from the point of view of regulation, while the quality of the weld is not deleteriously affected.

In another embodiment of the welding system according to the invention, which embodiment can be derived from the circuit diagram of FIG. 4, the regulating loop is permanently closed while the integrating amplifier 42, together with the capacitor 46, forms part of the regulating circuit. This arrangement is obtained by omitting the unit 53, the switches 67 and 69 and the capacitor 71. Regulation now is effected with regard to the mean value of $I_b \cdot T_b$ over a time much longer than the cycle time T. In this case the equality (1) will be:

$$Q_m = \text{summation of } (I_{bgem} \cdot T_b) \tag{7}$$

and the equality (2) will be:

$$Q_r = B \cdot I_r \cdot t \tag{8}$$

where $t$ is the time from an instant zero.
Thus the equality (6) will be:

$$V_{43} = \frac{t}{C_{46}} \left[ \frac{\text{summation } (I_{bgem} \cdot T_b)}{t} - B \cdot I_r \right] \tag{9}$$

From the equality (9) it can also be deduced that the mean arc power, which is represented by $$\text{summation } \frac{(I_{bgem} \cdot T_b)}{t},$$

is controlled using the value $B \cdot I_r$ as a reference.

The circuit arrangement of FIG. 4 can also be used for continuous arc welding. The pulse train 51 may be produced separately, or it may be dispensed with so that the switch 64 is continuously closed and in the expression (9) $T_b$ is equal to $t$.

This may be explained by means of the following formulas:

$$\text{mean arc power } P_b = \frac{1}{t} \cdot \text{summation} \int_0^{T_b} E_b \cdot I_b \cdot dt \tag{10}$$

Assuming the arc voltage $E_b$ to be substantially constant, which is in satisfactory agreement with practice, we have:

$$P_b = E_b/t \cdot \text{summation} \int_0^{T_b} I_b \cdot dt \tag{11}$$

$$P_b = E_b \cdot \frac{\text{summation } (I_{bgem} \cdot T_b)}{t} \tag{12}$$

Now if $t = T$, we have:

$$P_b = E_b \cdot I_{bgem} \cdot \frac{T_b}{T} \tag{13}$$

$$P_b = E_b \cdot I_{bgem} \cdot A_b \tag{14}$$

It will be clear that the equality (6) is associated with the equality (14) and that the equality (9) is associated with the equality (12).

In the description of the FIGS. it has been assumed that a person skilled in the art is sufficiently conversant with the components and circuits used, such as operational amplifiers, multivibrators, limiting means, level detection means, etc., and the operation thereof, and hence a fuller discussion has been dispensed with.

It should be mentioned that the welding system described may further be provided with:

additional control means which the welder can operate by hand, on the wire holder, or by foot and which influence the welding process with respect to an improved start or termination of a welded joint, additional control means in the pulse shaper which facilitate initiation of a welding process and which, as the case may be, cooperate with a memory circuit which stores the latest value of the control quantity or the latest setting of the regulating device 28 of FIG. 1 to facilitate starting of a weld after an interruption of the welding process, for example when welds of one and the same type are to be made in series on a plurality of workpieces.

What is claimed is:

1. A short-circuit arc welding system comprising, a source of welding energy, a device for feeding a consumable electrode wire towards a workpiece to provide regular alternate short-circuit and arcing relationship between the electrode wire and workpiece, an electrode wire holder having a terminal connected to a terminal of said welding energy source, means connecting said workpiece to a second terminal of said welding energy source, a measuring device including means for producing a measuring quantity representative only of the mean arc power $P_b$ of the welding system, a comparison device having a first input for receiving a preset reference quantity indicative of a desired value of mean arc power and a second input for receiving said measuring quantity and means for comparing said reference and measuring quantities to generate a control quantity in the event of a deviation between the reference and measuring quantities, and regulating means responsive to said control quantity for adjusting a welding control parameter of the welding system in a compensating sense to maintain the mean arc power substantially constant.

2. A welding system as claimed in claim 1 wherein the comparison device comprises an integrating amplifier having an output terminal connected via an integrating capacitor to a first input terminal and a second input terminal connected to ground whereby the output terminal delivers the control quantity, the first input terminal also being a summation point for receiving the measuring quantity and the reference quantity, said reference quantity being determined by the position of a slider of a potentiometer which is connected to a reference potential and the value of a resistor which is connected between the slider and the first input terminal.

3. A welding system as claimed in claim 1 wherein said regulating means includes a first regulating device controlled by said control quantity and a motor regulating device coupled to the output of the first regulating device to control said wire feeding device to adjust the electrode wire feed rate as a function of said control quantity.

4. A welding system as claimed in claim 1 wherein said regulating means includes a first regulating device controlled by said control quantity, and the source of welding energy includes a controllable current switch and a control unit responsive to the output of the first regulating device to control the operation of said controlled current switch so as to adjust the open-circuit voltage $E_o$ of the welding system in a sense to reduce the value of said control quantity.

5. A welding system as claimed in claim 1 wherein said welding energy source, said wire feeding device, said wire holder and the means connecting the energy source to the wire holder and the workpiece together comprise a welding current circuit, said measuring device comprising a current measuring device having an input connected to the welding current circuit so as to measure the flow of arc current during the arc time of a welding cycle and having an output at which it delivers a measuring quantity control signal proportional to said arc current so that the measuring quantity is proportional to the mean arc current flowing during the welding cycle arc time.

6. A welding system as claimed in claim 1 wherein the measuring device comprises means responsive to the flow of welding current for deriving a control signal proportional thereto, means responsive to the welding voltage for generating a rectangular waveform signal which is a measure of the arc time $T_b$, and means for combining said control signal and said rectangular arc time signal for producing a measuring quantity signal proportional to the product of the mean arc current and the arc time.

7. A welding system as claimed in claim 1 wherein the comparison device comprises an integrating amplifier having an input terminal for receiving the measuring quantity and the reference quantity and an output terminal and with an integrating capacitor connected between said input and output terminals, and the measuring device comprises means responsive to the welding voltage for generating a rectangular waveform signal which is a measure of the arc time $T_b$, a timing circuit comprising first and second monostable multivibrators the first of which is triggered by an edge of the rectangular waveform signal which corresponds to the end of the short-circuit welding condition to deliver a sampling pulse, said second multivibrator being triggered by the trailing edge of the sampling pulse to produce a reset pulse, a first controlled switch connecting the output of the integrating amplifier to a storage capacitor which develops a voltage corresponding to the control quantity, means coupling the storage capacitor to said regulating means, a second controlled switch connected to selectively short-circuit the integrating capacitor, means for applying the sampling pulse to a control input of the first switch to cause said first switch to pass current, and means for applying the reset pulse to a control input of the second switch to cause the second switch to pass current during the receipt of said reset pulse.

8. A welding system as claimed in claim 1 wherein said measuring device includes a current measuring device having input means responsive to the flow of arc current to supply at its output a measuring quantity control signal proportional to the mean arc current flowing during the arc time of a welding cycle that also includes a short-circuit time period.

9. A welding system as claimed in claim 8 wherein the measuring device comprises a pulse shaper having an input responsive to the welding voltage during a welding cycle, short-circuit/arc/short-circuit, for generating a corresponding rectangular signal, and a time keeper circuit connected to the output of the pulse shaper for supplying to the current measuring device a first time signal which is a measure of the arc time $T_b$.

10. A welding system as claimed in claim 9 wherein the time keeper circuit supplies a second time signal which is a measure of the welding cycle time T and includes a divider circuit by means of which the second time signal is divided by the first time signal to deliver at its output a third time signal proportional to the relative arc time $A_b$ defined as $T_b/T$.

11. A welding system as claimed in claim 10 wherein the measuring device includes means responsive to the arc current for deriving a control signal proportional thereto and a multiplying circuit to which the said control signal and the said third time signal are applied and which produces at its output the product of said signals so that the measuring quantity is proportional to the product of the relative arc time and the mean arc current.

12. A welding system as claimed in claim 1 having a welding cycle composed of regular alternate arc time periods and short-circuit time periods and wherein the measuring device comprises, means responsive to the welding energy source output voltage for deriving a time control signal determined by the arc time only, and current measuring means responsive to said time control signal and to the flow of welding current for deriving at its output an electric control signal proportional only to the mean arc current that flows during the arc time of a welding cycle.

* * * * *

UNITED STATES PATENT AND TRADEMARK OFFICE
CERTIFICATE OF CORRECTION

PATENT NO. : 4,000,374
DATED : December 28, 1976
INVENTOR(S) : EDMOND JOANNES JOZEF DE KEYSER It is certified that error appears in the above-identified patent and that said Letters Patent are hereby corrected as shown below:

IN THE ABSTRACT line 5, "short-circuiting" should be --short-circuit--;

Column 5, line 45, "generally" should be --greatly--;

Column 6 line 67, "the pulse shaper" should be cancelled;

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*